UNITED STATES PATENT OFFICE.

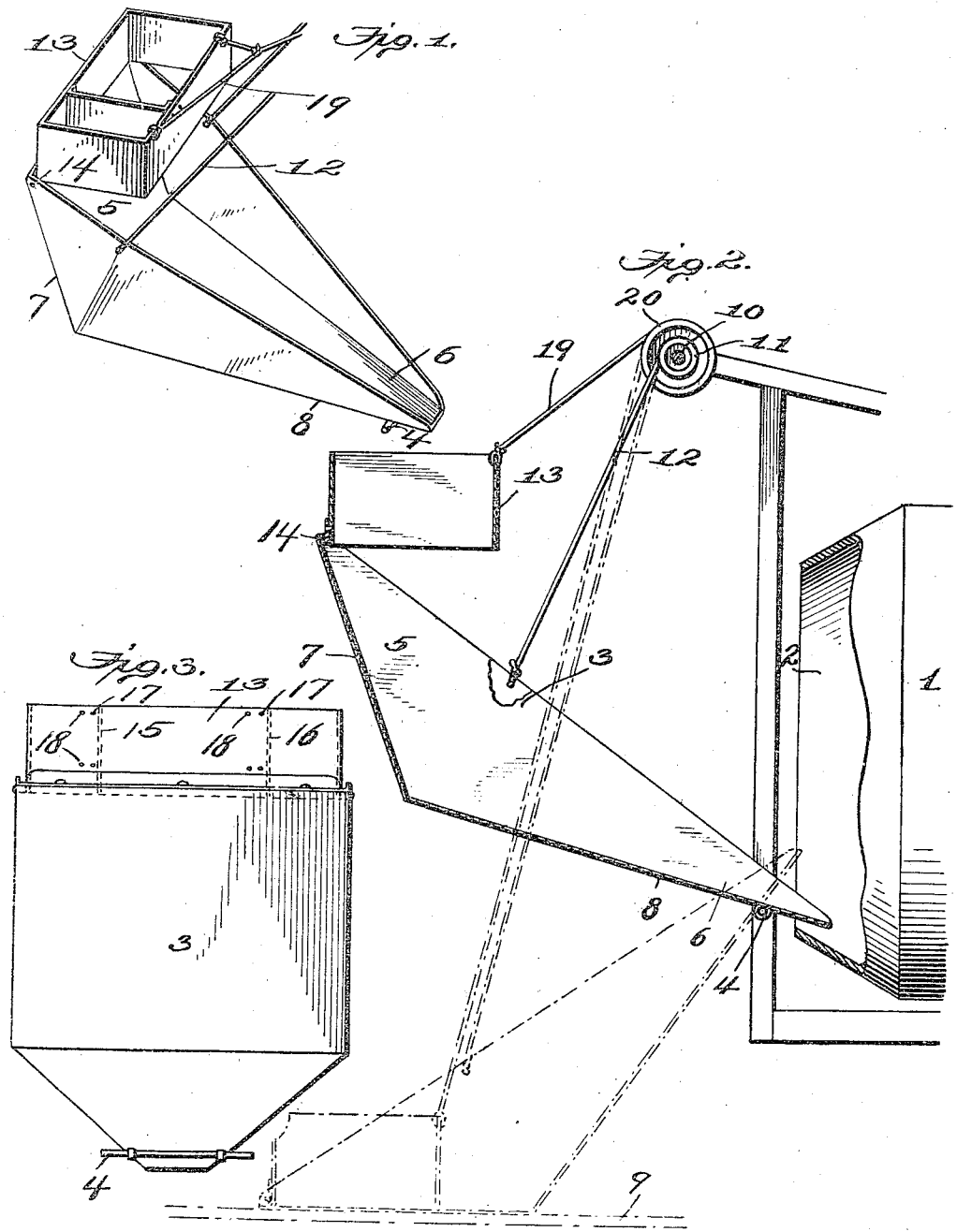

CHARLES M. FURMAN, JR., OF GREAT FALLS, SOUTH CAROLINA.

MEASURING MEANS FOR CONCRETE AND OTHER MIXERS.

1,267,208.

Specification of Letters Patent.

Patented May 21, 1918.

Application filed September 7, 1917. Serial No. 190,217.

*To all whom it may concern:*

Be it known that I, CHARLES M. FURMAN, Jr., a citizen of the United States, residing at Great Falls, in the county of Chester and State of South Carolina, have invented new and useful Improvements in Measuring Means for Concrete and other Mixers, of which the following is a specification.

The present invention relates to improvements in concrete and other mixing apparatus, and the primary object is to provide novel means for measuring the constituents in the making up of each charge or batch whereby the aggregate will embody the correct or desired proportions of its constituents. The invention is particularly applicable to concrete and fertilizer mixers of a type wherein the charges or batches of the constituents are dumped into a revolving drum or equivalent mixing device by a tilting hopper, an open-bottom measuring receptacle being provided which is pivoted or movable relatively to the hopper, and this measuring receptacle occupies such a position that its bottom will be closed by the hopper when such receptacle is being filled with the constituents of the charge and it is movable relatively to the hopper into a position where its bottom is uncovered by the hopper when the latter is swung into a position to dump the charge into the mixer, the relative movements between the measuring receptacle and the hopper being preferably effected automatically as the hopper is moved from charge-receiving to charge-dumping position.

To these and other ends, the invention consists in certain improvements, and combinations and arrangements of parts, all as will be hereinafter more fully described, the novel features being pointed out particularly in the claims at the end of the specification.

In the accompanying drawings:—

Figure 1 is a perspective view of a charging hopper for mixers, the same being equipped with a measuring device in accordance with the present invention.

Fig. 2 represents a section taken longitudinally through the hopper and through the measuring receptacle, this view showing the hopper and measuring device in coöperation with the mixing apparatus; and Fig. 3 shows the hopper and measuring device as viewed from the left in Fig. 2.

Similar parts are designated by the same reference characters in the several views.

The present invention provides means which is applicable to concrete mixing apparatus in general for accurately measuring the constituents in the making up of charges or batches of concrete whereby the concrete will embody uniformly the correct or desired proportions of its constituents, such as cement and sand or cement, sand, and gravel or stone. The invention is particularly adapted for use in connection with concrete making apparatus of the type embodying a revolving drum or equivalent device wherein the constituents are mixed and a tiltable hopper which receives the constituents and dumps the same into the mixing device. The preferred embodiment of the invention is shown in the accompanying drawing and will be hereinafter described in detail, but it is to be understood that the invention is not restricted to the precise construction and arrangement shown, as equivalent constructions are contemplated and will be included within the scope of the claims.

In the present instance, 1 represents a portion of a revolving concrete mixing drum, such drums being commonly employed which are revolved usually on a horizontal axis, the drum containing baffles to insure thorough mixing of the constituents with one another and with the water, the mixed concrete being removed from the end of the drum (not shown) and the constituents being received by the drum through the open end 2.

3 represents the charging hopper for the mixing drum and it may be similar to charging hoppers used in concrete mixers of this type. As shown, it is pivoted to tilt on a horizontal axis 4 and it comprises a charge-receiving end 5 and a discharging end 6, the latter being movable into the charge-receiving opening 2 of the mixing drum. The bottom sections 7 and 8 usually diverge from the axis 4, as shown, in order to permit the bottom section 7 of the charge-receiving end 5 of the hopper to occupy a substantially horizontal position and to rest flatwise on a charging platform 9. By referring to Fig. 2, it will be understood that the hopper occupies the dotted line position when receiving a charge and that it is swung into the full line position to dump the charge into the mixer, the shift in the position of the hopper causing the material at the charge-receiving end 5 thereof to fall by gravity onto the lower bottom section 8, and the inclination of the latter is sufficient to cause the material to descend by gravity along the bottom of the hopper and to enter the mixer. Different means may be provided for swinging the hopper from the charge-receiving to the charge-dumping position, and vice versa. Commonly, and as shown, a shaft 10 is employed having drums 11 thereon, and wire cables 12 attached to the sides of the hopper are adapted to be wound upon and unwound from these drums to effect the necessary swinging movements of the hopper.

Heretofore, the practice in the mixing of concrete has been such that the proportioning of the constituents thereof has only approximated the desired or correct value. For example, it has been the practice heretofore to introduce certain numbers of wheelbarrow loads of the sand, and stone or gravel into the charging hopper of the mixer, each wheelbarrow load representing a certain part of the percentage of each constituent, but, owing to lack of uniformity in the loading of the wheelbarrows, it has been found that the proportions of the constituents vary materially for each batch of concrete. The present invention provides a device which is capable of accurately measuring the constituents for each charge or batch whereby a correct proportion of the constituents can be maintained and, in consequence, the concrete for the various batches will be uniform. In the preferred embodiment of the invention as shown, this measuring device is so combined with the charging hopper for the mixer that it operates automatically and hence enables the apparatus to be manipulated with substantially the same degree of facility as heretofore, and, furthermore, the measuring device of the present invention is easily attachable to the charging hoppers of concrete mixers of this type as previously used. The measuring device as shown in the present instance comprises a receptacle 13 which is open at the bottom and it is pivotally connected along one of its edges by a hinge or equivalent means 14 to the rear edge of the charging hopper whereby this receptacle may swing to and from a position where its lower edge rests on the bottom section 7 of the charging hopper. The measuring receptacle preferably extends across the full width of the charge-receiving end 5 of the hopper and it may be of different heights and widths according to the capacity of the mixing drum. The measuring receptacle is divided into two or more compartments by one or more transverse partitions. As shown in Fig. 1, a single partition 15 is provided, thus dividing the measuring receptacle into two compartments which may be filled respectively with stone and sand. In Fig. 3, two partitions 15 and 16 are provided, thus dividing the measuring receptacle into three compartments which may receive respectively, sand, stone and gravel. These partitions may be placed in different positions in the measuring receptacle in order to vary the proportions of the constituents. Any suitable means may be provided for holding the partitions in different adjusted positions. As shown, the ends of the partitions are flanged and small bolts 17 may be extended through these flanges and through openings 18 in the sides of the receptacle, different numbers of holes being provided to enable the partitions to be set in different positions longitudinally of the measuring receptacle.

According to the present invention, the measuring receptacle rests upon the bottom section 7 of the charging hopper when the latter is swung into the charge-receiving position as shown by the dotted lines in Fig. 2. The bottom of the measuring receptacle will then be closed by the bottom section 7 of the charging hopper. The constituents for the charge are then introduced into the appropriate compartments of the measuring receptacle, thus measuring these constituents, and then the charging hopper is swung into its dumping position as shown by the full lines in Fig. 2. As the charging hopper is swung into its dumping position, the measuring receptacle is swung upwardly relatively to the hopper about the hinge or pivot 14, thereby uncovering the bottom of the measuring receptacle and causing the constituents of the charge to flow out of the measuring receptacle and into the charging hopper and thence along the latter into the mixing drum. Preferably, and as shown, the measuring receptacle is swung automatically to dump its contents into the charging hopper, a wire cable 19 being preferably attached to the measuring receptacle which cable is adapted to wind upon and unwind from the drum 20 on the shaft 10 which controls the movements of the charging hopper from charge-receiving to charge-dumping position, and vice versa.

What is claimed is:—

1. In concrete mixing apparatus, the combination of a charging hopper movable from a charge-receiving position to a charge-dumping position, and a measuring device having compartments, each closed on all sides for holding the different constituents of the charge, such device being adapted to receive and hold separately the constituents of each charge when the hopper is in its charge-receiving position and having means for moving it relatively to the hopper to discharge such constituents into the hopper when the hopper is moved into its dumping position.

2. In concrete mixing apparatus, the combination of a mixer-charging hopper tiltable to and from a charge-receiving position, and a measuring device having means to receive and hold material when the hopper is in its charge-receiving position and also having means for moving it automatically relatively to the hopper to discharge its contents into the hopper when the latter is tilted out of its receiving position.

3. In concrete mixing apparatus, the combination of a hopper, and a measuring receptacle having compartments for the constituents of each charge, said receptacle being movable relatively to the hopper and adapted when in one position to hold the constituents therein and operative in another position to discharge such constituents into the hopper.

4. In concrete mixing apparatus, the combination of a hopper, and a measuring receptacle having open-bottom compartments for the constituents of each charge and movable relatively to the hopper to cause the latter to close and uncover respectively the open bottoms of its compartments.

5. In concrete mixing apparatus, the combination of a hopper, and a measuring receptacle having open-bottom compartments therein and pivoted at one of its edges to the hopper, the hopper at one position of said receptacle coöperating therewith to close the bottoms of its compartments, and in another position of the receptacle uncovering the bottoms of its compartments.

6. In concrete mixing apparatus, the combination of a hopper mounted to rock on a transverse axis, and a measuring receptacle having open-bottom compartments for the constituents of each charge and pivotally connected to the hopper on an axis parallel to the axis of motion of the hopper, the hopper coöperating with the receptacle at one relative position of these parts to close the bottoms of the compartments, and uncovering the bottoms of the compartments to permit discharge of the contents thereof at another relative position of the hopper and receptacle.

7. In concrete mixing apparatus, the combination of a tiltable hopper, and a measuring receptacle pivotally connected at one of its lower edges to the hopper, said receptacle having an open bottom which is covered and uncovered by relative movements between the hopper and receptacle.

8. In concrete mixing apparatus, the combination of a tiltable hopper, a receptacle movably connected to the hopper and adapted to receive and measure material for the hopper, and means for automatically discharging the contents of such receptacle into the hopper as the latter is tilted from a receiving to a dumping position.

In testimony whereof I have hereunto set my hand in presence of two subscribing witnesses.

CHARLES M. FURMAN, Jr.

Witnesses:
JAS. LYBRAND, Jr.,
JNO. O. HOWARD.

Copies of this patent may be obtained for five cents each, by addressing the "Commissioner of Patents, Washington, D. C."